US008494666B2

(12) United States Patent
Seo et al.

(10) Patent No.: US 8,494,666 B2
(45) Date of Patent: *Jul. 23, 2013

(54) METHOD FOR GENERATING AND CONSUMING 3-D AUDIO SCENE WITH EXTENDED SPATIALITY OF SOUND SOURCE

(75) Inventors: Jeong-Il Seo, Daejon (KR); Dae-Young Jang, Daejon (KR); Kyeong-Ok Kang, Daejon (KR); Jin-Woong Kim, Daejon (KR); Chie-Teuk Ahn, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/796,808

(22) Filed: Apr. 30, 2007

(65) Prior Publication Data

US 2007/0203598 A1 Aug. 30, 2007

Related U.S. Application Data

(62) Division of application No. 10/531,632, filed on Oct. 31, 2005, now abandoned.

(30) Foreign Application Priority Data

Oct. 15, 2002 (KR) ........................ 10-2002-0062962
Oct. 14, 2003 (KR) ........................ 10-2003-0071345

(51) Int. Cl.
*G06F 17/00* (2006.01)

(52) U.S. Cl.
USPC ............................................................ 700/94

(58) Field of Classification Search
USPC ..................... 700/94; 381/17, 18, 19, 61, 310
See application file for complete search history.

(56) References Cited

U.S. PATENT DOCUMENTS

| | | | | |
|---|---|---|---|---|
| 6,107,698 | A | 8/2000 | Ochiai et al. | |
| 6,275,589 | B1 | 8/2001 | Spille | |
| 7,113,610 | B1 * | 9/2006 | Chrysanthakopoulos | .... 381/309 |
| 2001/0037386 | A1 | 11/2001 | Takatsuka et al. | |
| 2001/0043738 | A1 | 11/2001 | Sawhney et al. | |

FOREIGN PATENT DOCUMENTS

| | | |
|---|---|---|
| CN | 1224982 | 8/1999 |
| CN | 1295778 | 5/2001 |
| CN | 1200645 | 8/2001 |
| JP | 2000-267675 | 9/2000 |
| JP | 2001/251698 | 9/2001 |
| JP | 2002-218599 | 8/2002 |

OTHER PUBLICATIONS

Pihkala et al., "Extending SMIL with 3D Audio", Proceedings of the 2003 International Conference on Auditory Display, Boston, MA, USA, Jul. 6-9, 2003.*

(Continued)

*Primary Examiner* — Ping Lee
(74) *Attorney, Agent, or Firm* — NSIP Law

(57) ABSTRACT

A method of generating and consuming 3D audio scene with extended spatiality of sound source describes the shape and size attributes of the sound source. The method includes the steps of: generating audio object; and generating 3D audio scene description information including attributes of the sound source of the audio object.

12 Claims, 4 Drawing Sheets

OTHER PUBLICATIONS

Potard et al, "Using XML Sc hemas to Create and Encode Interactive 3-D Audio Scenes for Multimedia and Virtual Reality Applications", Lecture Notes in Computer Science; vol. 2468, Apr. 3-5, 2002, pp. 193-203.

Pihkala et al. "Proceedings of the 2003 International Conference on Auditory Display", Jul. 6-9, 2003, 4 pages.

A. J. Berkhout, et al. (May 1993). "Acoustic Control by Wave Field Synthesis." *J. Acoust. Soc. Am.* vol. 93, No. 5: pp. 2764-2778.

J. Blauert, (1997). "3: Spatial Hearing with Multiple Soud Sources and in Enclosed Spaces." *Spatial Hearing: The Psychophysics of Human Sound Localization*. MIT Press: pp. 201-202 (5 pages including cover page and table of contents).

International Organisation for Standardisation: Organisation Internationale De Normalisation. ISO/IEC JTC1/SC29/WG11. Coding of Moving Pictures and Audio: ISO/IEDC JTC1/SC29/WG11 N1483. Nov. 22, 1996. 44 pages, draft including cover page and table of contents, in English language.

International Organisation for Standardisation: Organisation Internationale De Normalisation. ISO/IEC JTC1/SC29/WG11. Coding of Moving Pictures and Audio: ISO/IEDC JTC1/SC29/WG11 N1901. Nov. 21, 1997. 223 pages, draft including cover page and table of contents, in English language.

B. Grill, et la. (1997). Information Technology—Coding of Audio-visual Objects. ISOJTC 1/SC 29 N 1903. Oct. 31, 1997 ISO/IEC CD 14496-3. 689 pages, divided in 6 parts, in English language.

* cited by examiner

FIG. 3

DirectiveSound {

| | | | |
|---|---|---|---|
| Field | MFFloat | angles | 0 |
| Field | MFFloat | directivity | 1 |
| Field | MFFloat | frequency | [] |
| Field | SFFloat | speedOfSound | 340 |
| Field | SFFloat | distance | 100 |
| Field | SFBool | useAirabs | FALSE |
| exposedField | SFVec3f | direction | 0, 0, 1 |
| exposedField | SFFloat | intensity | 1 |
| exposedField | SFVec3f | location | 0, 0, 0 |
| exposedField | SFVec3f | sourceDimensions | 0, 0, 0 |
| exposedField | SFNode | PerceptualParameters | NULL |
| exposedField | SFBool | RoomEffect | FALSE |
| exposedField | SFBool | Spatialize | TRUE |

METHOD FOR GENERATING AND CONSUMING 3-D AUDIO SCENE WITH EXTENDED SPATIALITY OF SOUND SOURCE

CROSS REFERENCE TO RELATED APPLICATIONS

This application is a division of application Ser. No. 10/531,632, filed on Oct. 31, 2005, which is a National Stage application of International Patent Application No. PCT/KR2003/002149 filed Oct. 15, 2003 and claims the benefit of Korean Patent Application Nos. 10-2002-0062962, filed Oct. 15, 2002 and 10-2003-0071345, filed Oct. 14, 2003, the entirety of each are incorporated herein by reference.

The present patent application is a Divisional of application Ser. No. 10/531,632, filed Oct. 31, 2005 now abandoned.

TECHNICAL FIELD

The present invention relates to a method for generating and consuming a three-dimensional audio scene having sound source whose spatiality is extended; and, more particularly, to a method for generating and consuming a three-dimensional audio scene to extend the spatiality of sound source in a three-dimensional audio scene.

BACKGROUND ART

Generally, a content providing server encodes contents in a predetermined encoding method and transmits the encoded contents to content consuming terminals that consume the contents. The content consuming terminals decode the contents in a predetermined decoding method and output the transmitted contents.

Accordingly, the content providing server includes an encoding unit for encoding the contents and a transmission unit for transmitting the encoded contents. On the other hand, the content consuming terminals includes a reception unit for receiving the transmitted encoded contents, a decoding unit for decoding the encoded contents, and an output unit for outputting the decoded contents to users.

Many encoding/decoding methods of audio/video signals are known so far. Among them, an encoding/decoding method based on Moving Picture Experts Group 4 (MPEG-4) is widely used these days. MPEG-4 is a technical standard for data compression and restoration technology defined by the MPEG to transmit moving pictures at a low transmission rate.

According to MPEG-4, an object of an arbitrary shape can be encoded and the content consuming terminals consume a scene composed of a plurality of objects. Therefore, MPEG-4 defines Audio Binary Format for Scene (Audio BIFS) with a scene description language for designating a sound object expression method and the characteristics thereof.

Meanwhile, along with the development in video, users want to consume contents of more lifelike sounds and video quality. In the MPEG-4 AudioBIFS, an AudioFX node and a DirectiveSound node are used to express spatiality of a three-dimensional audio scene. In these nodes, modeling of sound source is usually depended on point-source. Point-source can be described and embodied in a three-dimensional sound space easily.

Actual point-sources, however, tend to have a dimension more than two, rather than to be a point of literal meaning. More important thing here is that the shape of the sound source can be recognized by human beings, which is disclosed by J. Baluert, "Spatial Hearing," the MIT Press, Cambridge Mass., 1996.

For example, a sound of waves dashing against the coastline stretched in a straight line can be recognized as a linear sound source instead of a point sound source. To improve the sense of the real of the three-dimensional audio scene by using the AudioBIFS, the size and shape of the sound source should be expressed. Otherwise, the sense of the real of a sound object in the three-dimensional audio scene would be damaged seriously.

That is, the spatiality of a sound source could be described to endow a three-dimensional audio scene with a sound source which is of more than one-dimensional.

DISCLOSURE OF INVENTION

It is, therefore, an object of the present invention to provide a method for generating and consuming a three-dimensional audio scene having a sound source whose spatiality is extended by adding sound source characteristics information having information on extending the spatiality of the sound source to three-dimensional audio scene description information.

The other objects and advantages of the present invention can be easily recognized by those of ordinary skill in the art from the drawings, detailed description and claims of the present specification.

In accordance with one aspect of the present invention, there is provided a method for generating a three-dimensional audio scene with a sound source whose spatiality is extended, including the steps of: a) generating a sound object; and b) generating three-dimensional audio scene description information including sound source characteristics information for the sound object, wherein the sound source characteristics information includes spatiality extension information of the sound source which is information on the size and shape of the sound source expressed in a three-dimensional space.

In accordance with one aspect of the present invention, there is provided a method for consuming a three-dimensional audio scene with a sound source whose spatiality is extended, including the steps of: a) receiving a sound object and three-dimensional audio scene description information including sound source characteristics information for the sound object; and b) outputting the sound object based on the three-dimensional audio scene description information, wherein the sound source characteristics information includes spatiality extension information which is information on the size and shape of a sound source expressed in a three-dimensional space.

BRIEF DESCRIPTION OF DRAWINGS

The above and other objects and features of the present invention will become apparent from the following description of the preferred embodiments given in conjunction with the accompanying drawings, in which:

FIG. 3 shows an example where spatiality extension information is added to a "DirectiveSound" node of AudioBIFS in accordance with the present invention;

BEST MODE FOR CARRYING OUT THE INVENTION

Figure 1A:
FIG. 1 is a diagram illustrating various shapes of sound sources.
Figure 1B:
Figure 1C:
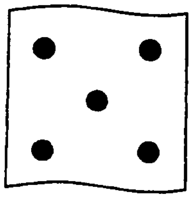
Figure 1D:
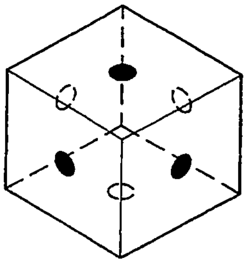

Other objects and aspects of the invention will become apparent from the following description of the embodiments with reference to the accompanying drawings, which is set forth hereinafter.

Following description exemplifies only the principles of the present invention. Even if they are not described or illustrated clearly in the present specification, one of ordinary skill in the art can embody the principles of the present invention and invent various apparatuses within the concept and scope of the present invention.

The use of the conditional terms and embodiments presented in the present specification are intended only to make the concept of the present invention understood, and they are not limited to the embodiments and conditions mentioned in the specification.

In addition, all the detailed description on the principles, viewpoints and embodiments and particular embodiments of the present invention should be understood to include structural and functional equivalents to them. The equivalents include not only currently known equivalents but also those to be developed in future, that is, all devices invented to perform the same function, regardless of their structures.

For example, block diagrams of the present invention should be understood to show a conceptual viewpoint of an exemplary circuit that embodies the principles of the present invention. Similarly, all the flowcharts, state conversion diagrams, pseudo codes and the like can be expressed substantially in a computer-readable media, and whether or not a computer or a processor is described distinctively, they should be understood to express various processes operated by a computer or a processor.

Functions of various devices illustrated in the drawings including a functional block expressed as a processor or a similar concept can be provided not only by using hardware dedicated to the functions, but also by using hardware capable of running proper software for the functions. When a function is provided by a processor, the function may be provided by a single dedicated processor, single shared processor, or a plurality of individual processors, part of which can be shared.

The apparent use of a term, 'processor', 'control' or similar concept, should not be understood to exclusively refer to a piece of hardware capable of running software, but should be understood to include a digital signal processor (DSP), hardware, and ROM, RAM and non-volatile memory for storing software, implicatively. Other known and commonly used hardware may be included therein, too.

In the claims of the present specification, an element expressed as a means for performing a function described in the detailed description is intended to include all methods for performing the function including all formats of software, such as combinations of circuits for performing the intended function, firmware/microcode and the like. To perform the intended function, the element is cooperated with a proper circuit for performing the software. The present invention defined by claims includes diverse means for performing particular functions, and the means are connected with each other in a method requested in the claims. Therefore, any means that can provide the function should be understood to be an equivalent to what is figured out from the present specification.

Other objects and aspects of the invention will become apparent from the following description of the embodiments with reference to the accompanying drawings, which is set forth hereinafter. The same reference numeral is given to the same element, although the element appears in different drawings. In addition, if further detailed description on the related prior arts is determined to blur the point of the present invention, the description is omitted. Hereafter, preferred embodiments of the present invention will be described in detail.

FIG. 1 is a diagram illustrating various shapes of sound sources. Referring to FIG. 1, a sound source can be a point, a line, a surface and space having a volume. Since sound source has an arbitrary shape and size, it is very complicated to describe the sound source. However, if the shape of the sound source to be modeled is controlled, the sound source can be described less complicatedly.

In the present invention, it is assumed that point sound sources are distributed uniformly in the dimension of a virtual sound source in order to model sound sources of various shapes and sizes. As a result, the sound sources of various shapes and sizes can be expressed as continuous arrays of point sound sources. Here, the location of each point sound source in a virtual object can be calculated using a vector location of a sound source which is defined in a three-dimensional scene.

When a spatial sound source is modeled with a plurality of point sound sources, the spatial sound source should be described using a node defined in AudioBIFS. When the node defined in AudioBIFS, which will be referred to as an AudioBIFS node, is used, any effect can be included in the three-dimensional scene. Therefore, an effect corresponding to the spatial sound source can be programmed through the AudioBIFS node and inserted to the three-dimensional scene.

However, this requires very complicated Digital Signal Processing (DSP) algorithm and it is very troublesome to control the dimension of the spatial sound source.

Also, the point sound sources distributed in a limited dimension of an object are grouped using the AudioBIFS, and the spatial location and direction of the sound sources can be changed by changing the sound source group. First of all, the characteristics of the point sound sources are described using a plurality of "DirectiveSound" node. The locations of the point sound sources are calculated to be distributed on the surface of the object uniformly.

Subsequently, the point sound sources are located with a spatial distance that can eliminate spatial aliasing, which is disclosed by A. J. Berkhout, D. de Vries, and P. Vogel, "Acoustic control by wave field synthesis," J. Aoust. Soc. Am., Vol. 93, No. 5 on pages from 2764 to 2778, May, 1993. The spatial sound source can be vectorized by using a group node and grouping the point sound sources.

Figure 2:
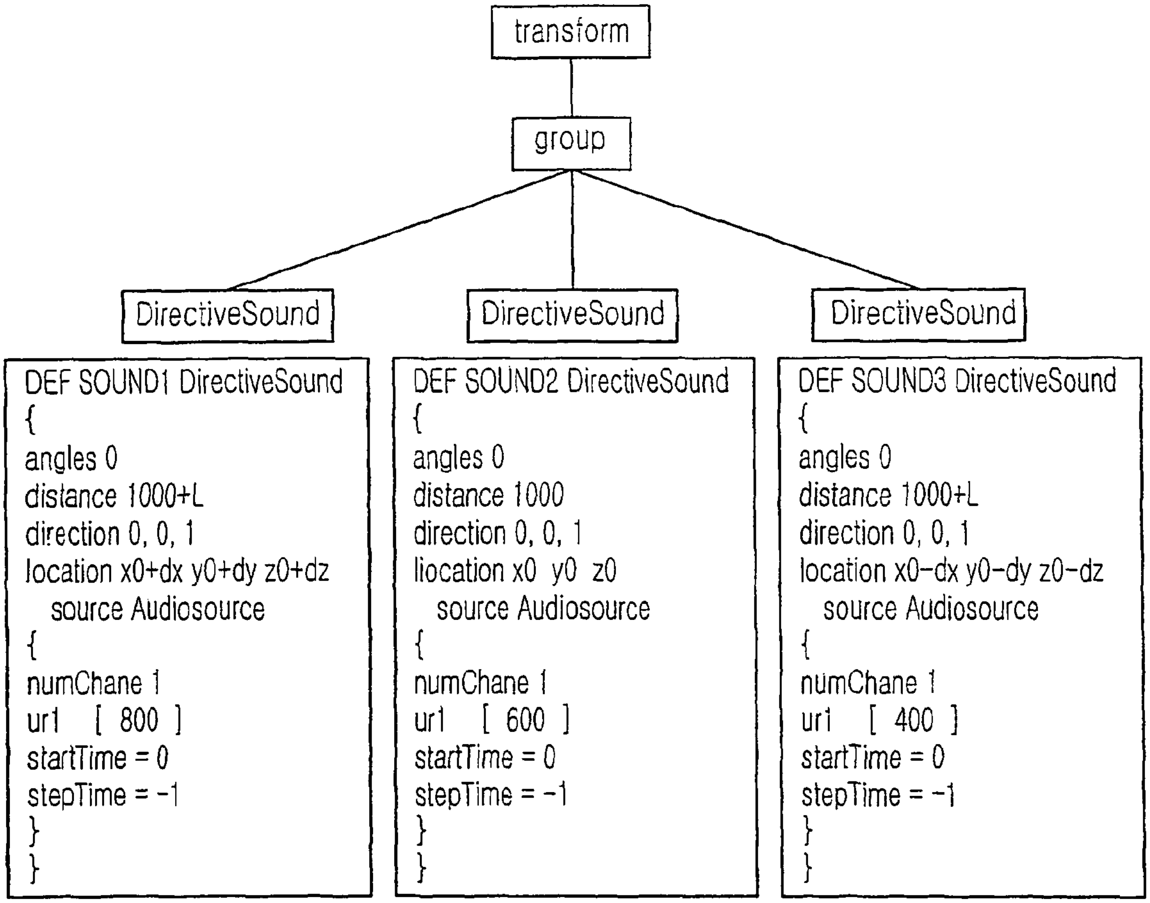
FIG. 2 is a diagram describing a method for expressing spatial sound source by grouping successive point sound sources.

FIG. 2 is a diagram describing a method for expressing spatial sound source by grouping successive point sound sources. In the drawing, a virtual successive linear sound source is modeled by using three point sound sources which are distributed uniformly along the axis of the linear sound source.

The locations of the point sound sources are determined to be ($x_0$−dx, $y_0$−dy, $z_0$−dz), ($x_0$, $y_0$, $z_0$), and ($x_0$+dx, $y_0$+dy, $z_0$+dz) according to the concept of the virtual sound source. Here, dx, dy and dz can be calculated from a vector between a listener and the location of the sound source and the angle between the direction vectors of the sound source, the vector and the angle which are defined in an angle field and a direction field.

FIG. 2 describes a spatial sound source by using a plurality of point sound sources. AudioBIFS appears it can support the description of a particular scene. However, this method requires too much unnecessary sound object definition. This is because many objects should be defined to model one single object.

When it is told that the genuine object of hybrid description of Moving Picture Experts Group 4 (MPEG-4) is more object-oriented representations, it is desirable to combine the point sound sources, which are used for model one spatial sound source, and reproduce one single object.

In accordance with the present invention, a new field is added to a "DirectiveSound" node of the AudioBIFS to describe the shape and size attributes of a sound source. FIG. 3 shows an example where spatiality extension information is added to a "DirectiveSound" node of AudioBIFS in accordance with the present invention.

Referring to FIG. 3, a new rendering design corresponding to a value of a "SourceDimensions" field is applied to the "DirectiveSound" node. The "SourceDimensions" field also includes shape information of the sound source. If the value of the "SourceDimensions" field is "0,0,0", the sound source becomes one point, no additional technology for extending the sound source is applied to the "DirectiveSound" node. If the value of the "SourceDimensions" field is a value other than "0,0,0", the dimension of the sound source is extended virtually.

The location and direction of the sound source are defined in a location field and a direction field, respectively, in the "DirectiveSound" node. The dimension of the sound source is extended in vertical to a vector defined in the direction field based on the value of the "SourceDimensions" field.

The "location" field defines the geometrical center of the extended sound source, whereas the "SourceDimensions" field defines the three-dimensional size of the sound source. In short, the size of the sound source extended spatially is determined according to the values of $\Delta x$, $\Delta y$ and $\Delta z$.

Figure 4:
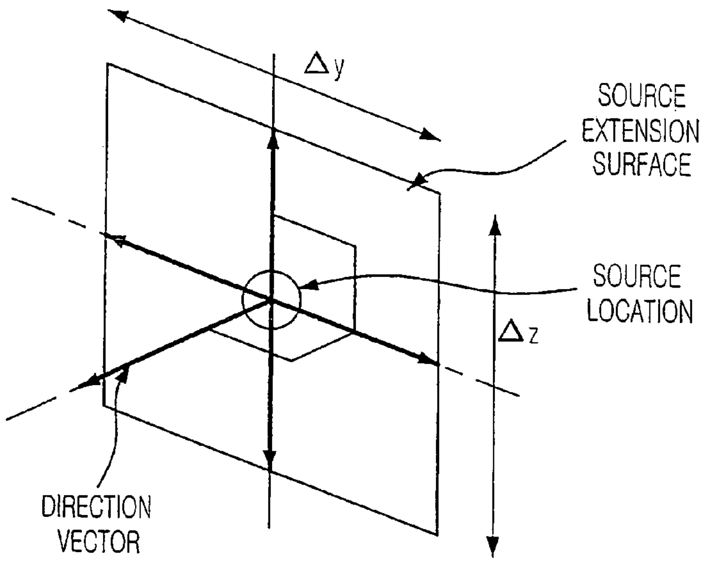
FIG. 4 is a diagram illustrating how a sound source is extended in accordance with the present invention.

FIG. 4 is a diagram illustrating how a sound source is extended in accordance with the present invention. As illustrated in the drawing, the value of the "SourceDimensions" field is $(0, \Delta y, \Delta z)$, Ay and Az being not zero ($\Delta y \neq 0$, $\Delta z \neq 0$). This indicates a surface sound source having an area of $\Delta y \times \Delta z$.

The illustrated sound source is extended in a direction vertical to a vector defined in the "direction" field based on the values of the "SourceDimensions" field, i.e., $(0, \Delta y, \Delta z)$, and thereby forming a surface sound source. As shown in the above, when the dimension and location of a sound source is defined, the point sound sources are located on the surfaces of the extended sound source. In the present invention, the locations of the point sound sources are calculated to be distributed on the surfaces of the extended sound source uniformly.

Figure 5A:
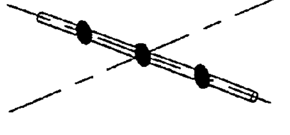
FIG. 5 is a diagram depicting the distributions of point sound sources based on the shapes of various sound sources in accordance with the present invention.
Figure 5B:
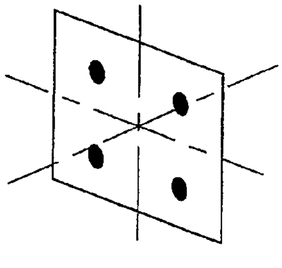
Figure 5C:
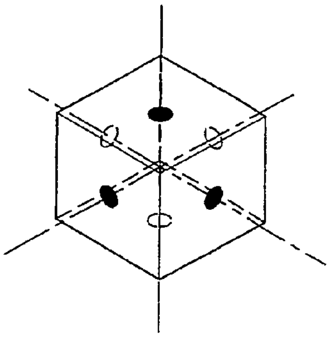

FIGS. 5A to 5C are diagrams depicting the distributions of point sound sources based on the shapes of various sound sources in accordance with the present invention. The dimension and distance of a sound source are free variables. So, the size of the sound source that can be recognized by a user can be formed freely.

For example, multi-track audio signals that are recorded by using an array of microphones can be expressed by extending point sound sources linearly as shown in FIG. 5A. In this case, the value of the "SourceDimensions" field is $(0, 0, \Delta z)$.

Also, different sound signals can be expressed as an extension of a point sound source to generate a spread sound source. FIGS. 5B and 5C show a surface sound source expressed through the spread of the point sound source and a spatial sound source having a volume. In case of FIG. 5B, the value of the "SourceDimensions" field is $(0, \Delta y, \Delta z)$ and, in case of FIG. 5C, the value of the "SourceDimensions" field is $(\Delta x, \Delta y, \Delta z)$.

As the dimension of a spatial sound source is defined as described in the above, the number of the point sound sources (i.e., the number of input audio channels) determines the density of the point sound sources in the extended sound source.

If an "AudioSource" node is defined in a "source" field, the value of a "numChan" field may indicate the number of used point sound sources. The directivity defined in "angle," "directivity" and "frequency" fields of the "DirectiveSound" node can be applied to all point sound sources included in the extended sound source uniformly.

The apparatus and method of the present invention can produce more effective three-dimensional sounds by extending the spatiality of sound sources of contents.

While the present invention has been described with respect to certain preferred embodiments, it will be apparent to those skilled in the art that various changes and modifications may be made without departing from the scope of the invention as defined in the following claims.

What is claimed is:

1. A method for processing a three-dimensional audio scene with a sound source whose spatiality is extended, comprising:

generating, by a computer, a sound object composing the audio scene; and generating, by the computer, three-dimensional audio scene description information including sound source characteristics information for the sound object, the three-dimensional audio scene description information including a plurality of point sound sources that model the sound object, wherein the sound object includes the plurality of point sound sources, wherein the sound source characteristics information includes spatiality extension information of the sound source, which is information on a size and shape of the sound source expressed in a three-dimensional space, and the plurality of point sound sources are distributed uniformly over a surface defined by the three-dimensional space, and wherein the spatiality extension information of the sound source includes sound source dimension information that is expressed as $x_0-\Delta x$, $y_0-\Delta y$, $z_0-\Delta z$; $x_0$, $y_0$, $z_0$; and $x_0+\Delta x$, $y_0+\Delta y$, $z_0+\Delta z$, wherein $\Delta x$, $\Delta y$, and $\Delta z$ are calculated based on a vector between a listener and the location of the sound source.

2. The method as recited in claim 1, wherein the spatiality extension information of the sound source further includes geometrical center location information of the sound source dimension information.

3. The method as recited in claim 1, wherein the spatiality extension information of the sound source describes a three-dimensional audio scene by extending the spatiality of the sound source in a direction vertical to the direction of the sound source.

4. A method for processing a three-dimensional audio scene with a sound source whose spatiality is extended, comprising:

receiving, by a computer, a sound object and three-dimensional audio scene description information comprising sound source characteristics information for the sound object, wherein the three-dimensional audio scene description information comprises a plurality of point sound sources that model the sound source, and wherein the sound object comprises the plurality of point sound sources; and outputting, by the computer, the sound object based on the three-dimensional audio scene description information, wherein the sound source characteristics information comprises spatiality extension information, which is information on a size and shape of the sound source expressed in a three-dimensional space, wherein the plurality of point sound sources are distributed uniformly over a surface defined by the three-dimensional space, and wherein spatiality extension information of the sound source includes sound source dimension information that is expressed as $x_0-\Delta x$, $y_0-\Delta y$, $z_0-\Delta z$; $x_0$, $y_0$, $z_0$; and $x_0+\Delta x$, $y_0+\Delta y$, $z_0+\Delta z$, wherein $\Delta x$, $\Delta y$, and $\Delta z$ are calculated based on a vector between a listener and the location of the sound source.

5. The method as recited in claim 4, wherein the spatiality extension information of the sound source further includes geometrical center location information of the sound source dimension information.

6. The method as recited in claim 4, wherein the spatiality extension information of the sound source describes a three-dimensional audio scene by extending the spatiality of the sound source in a direction vertical to the direction of the sound source.

7. A method configured to process a three-dimensional audio scene with a sound source whose spatiality is extended, comprising:

generating three-dimensional audio scene description information including sound source characteristics information for a generated sound object composing the audio scene, the three-dimensional audio scene description information including a plurality of point sound sources that model the sound object;

configuring the sound object to include the plurality of point sound sources;

configuring the sound source characteristics information to comprise spatiality extension information of the sound source, which is information on a size and shape of the sound source expressed in a three-dimensional space;

distributing the plurality of point sound sources uniformly over a surface defined by the three-dimensional space; and configuring the spatiality extension information of the sound source to comprise sound source dimension information that is expressed as $x0-\Delta x$, $y0-\Delta y$, $z0-\Delta z$; x0, y0, z0; and $x0+\Delta x$, $y0+\Delta y$, $z0+\Delta z$, wherein $\Delta x$, $\Delta y$, and $\Delta z$ are calculated based on a vector between a listener and the location of the sound source.

8. The method as recited in claim 7, further comprising:

configuring the spatiality extension information of the sound source to further comprise geometrical center location information of the sound source dimension information.

9. The method as recited in claim 7, further comprising:

configuring the spatiality extension information of the sound source to describe a three-dimensional audio scene by extending the spatiality of the sound source in a direction vertical to the direction of the sound source.

10. A computer program embodied on a non-transitory computer readable medium, the computer program being configured to control a processor to process a three-dimensional audio scene with a sound source whose spatiality is extended, comprising:

receiving a sound object and three-dimensional audio scene description information comprising sound source characteristics information for the sound object, wherein the three-dimensional audio scene description information comprises a plurality of point sound sources that model the sound source, and wherein the sound object comprises the plurality of point sound sources; and outputting the sound object based on the three-dimensional audio scene description information, wherein the sound source characteristics information comprises spatiality extension information, which is information on a size and shape of the sound source expressed in a three-dimensional space, wherein the plurality of point sound sources are distributed uniformly over a surface defined by the three-dimensional space, and wherein spatiality extension information of the sound source comprises sound source dimension information that is expressed as $x0-\Delta x$, $y0-\Delta y$, $z0-\Delta z$; x0, y0, z0; and $x0+\Delta x$, $y0+\Delta y$, $z0+\Delta z$, wherein $\Delta x$, $\Delta y$, and $\Delta z$ are calculated based on a vector between a listener and the location of the sound source.

11. The computer program embodied on the non-transitory computer readable medium as recited in claim 10, wherein the spatiality extension information of the sound source further includes geometrical center location information of the sound source dimension information.

12. The computer program embodied on the non-transitory computer readable medium as recited in claim 10, wherein the spatiality extension information of the sound source describes a three-dimensional audio scene by extending the spatiality of the sound source in a direction vertical to the direction of the sound source.

* * * * *